United States Patent [19]
Kawaguchi

[11] Patent Number: 5,171,985
[45] Date of Patent: Dec. 15, 1992

[54] SEMICONDUCTOR DETECTOR HAVING A VERTICAL OPTICAL AXIS AND CONFRONTING EMITTER-RECEIVER PAIR

[75] Inventor: Toshitada Kawaguchi, Yokohama, Japan

[73] Assignee: Kabushiki Kaisha Toshiba, Kawasaki, Japan

[21] Appl. No.: 791,135

[22] Filed: Nov. 13, 1991

[30] Foreign Application Priority Data

Nov. 13, 1990 [JP] Japan .................................. 2-306784

[51] Int. Cl.⁵ ................................................ H01J 5/02
[52] U.S. Cl. ...................................... 250/239; 257/80
[58] Field of Search ................... 250/239, 551, 231.13, 250/231.17, 231.18; 357/19, 30 D

[56] References Cited

U.S. PATENT DOCUMENTS 4,379,255  4/1983  Klose et al. ..................... 250/231.13
4,977,317  12/1990  Iwashima ............................. 250/239

Primary Examiner—David C. Nelms
Assistant Examiner—K. Shami
Attorney, Agent, or Firm—Oblon, Spivak, McClelland, Maier & Neustadt

[57] ABSTRACT

A semiconductor photoelectric detector comprising a detector unit and support device. The unit comprises light-emitting device, light-receiving device for receiving the light emitted by the light-emitting device, first and second wiring device electrically connected to the light-emitting device, third and fourth wiring device electrically connected to the light-receiving device, holder device holding the light-emitting and light-receiving device such that the optical axes of the light-emitting and -receiving device are aligned, and electrically insulating the first, second, third and fourth wiring device. The support device supports the detector unit such that the common optical axis of the light-emitting and -receiving device extends at right angle to that surface of the support device on which the detector unit is mounted, and has an electric current electrically connected to the first, second, third and fourth wiring device. The first and second wiring device or the third and fourth wiring device, or all wiring device are located, partly within the holder device, and extend parallel along one surface of the holder device. The distal end portions protrude from the same side of the holder device.

13 Claims, 8 Drawing Sheets

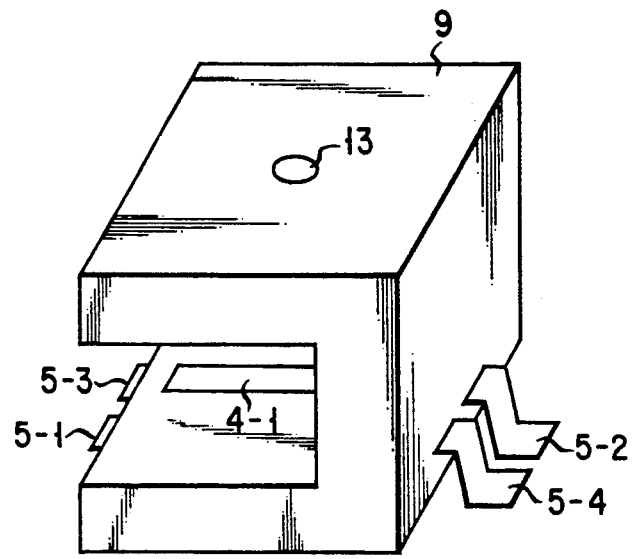
F I G. 3A
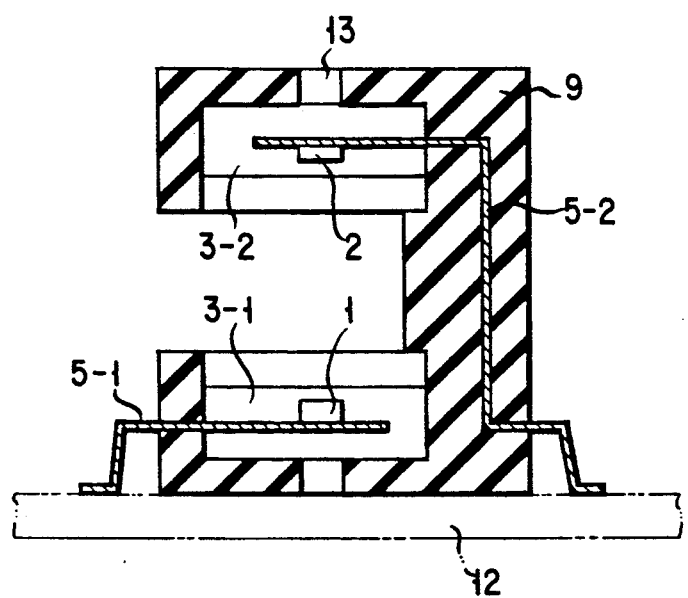
F I G. 3B

SEMICONDUCTOR DETECTOR HAVING A VERTICAL OPTICAL AXIS AND CONFRONTING EMITTER-RECEIVER PAIR

BACKGROUND OF THE INVENTION

1. Field of the Invention

The present invention relates to a semiconductor photoelectric detector and, more particularly, to a semiconductor photoelectric detector for use in cameras, office automation devices, and the like, for detecting the passage of an object.

2. Description of the Related Art

A conventional photoelectric detector of this type comprises a light-emitting chip (e.g., an LED), a light-receiving chip, and two leads connected to the light-emitting and light-receiving chips, respectively. The chips are sealed within two moldings, respectively, which are made of resin transparent to infrared rays. These moldings are sealed within a rectangular molding made of opaque resin, spaced apart from each other and positioned such that the optical axes of the chips are aligned. The photoelectric detector has a channel, through which an object is moved to be detected. The channel is made in that side of the rectangular molding which faces away from the side in which the leads are partly embedded. When the detector is mounted on a base, with the leads contacting the base, the common optical axis of the light-emitting and light-receiving chips extends horizontally. In some case, it is desired that the detector be positioned so that the common optical axis of the chips extends vertically. To position the detector in this way, it is necessary to fasten a vertical support to the base, to rotate the detector 90° C. and then attach it to the support, and to connect the leads to the circuit incorporated in the base.

SUMMARY OF THE INVENTION

The object of the present invention is to provide a semiconductor photoelectric detector which can easily be connected to a base.

According to the invention, there is provided a semiconductor photoelectric detector comprising a detector unit and support means. The detector unit comprises light-emitting means, light-receiving means for receiving the light emitted by the light-emitting means, first and second wiring means electrically connected to the light-emitting means, third and fourth wiring means electrically connected to the light-receiving means, holder means holding the light-emitting and light-receiving means such that the optical axes of the light-emitting and -receiving means are aligned, and electrically insulating the first, second, third and fourth wiring means. The support means supports the detector unit such that the common optical axis of the light-emitting and -receiving means extends at right angle to that surface of the support means on which the detector unit is mounted. The support means has an electric circuit electrically connected to the first, second, third and fourth wiring means. The first and second wiring means or the third and fourth wiring means, or all wiring means are located, partly within the holder means, and extend parallel along one surface of the holder means. The distal end portions protrude from the same side of the holder means.

Once the semiconductor photoelectric detector is mounted on a base, the common optical axis of the light-emitting and -receiving means is perpendicular to the base. Therefore, the detector can reliably detects any object which moves, crossing the common optical axis of the light-emitting and -receiving means. In addition, all wiring means can easily be connected to the base. No means is required for connecting the wiring means to the base, and the photoelectric detector can be made smaller than otherwise.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3A is a perspective view showing a second embodiment of the invention;

FIG. 3B is a cross-sectional view of the second embodiment, taken along line B-B in FIG. 3A;

DETAILED DESCRIPTION OF THE PREFERRED EMBODIMENTS

Embodiments of the present invention will now be described in detail, with reference to the accompanying drawings.

Figure 1A:
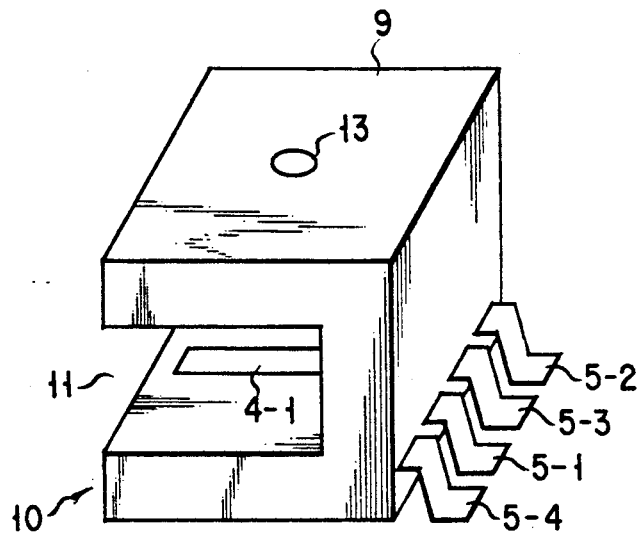
FIG. 1A is a perspective view showing a first embodiment of the present invention.
Figure 1B:
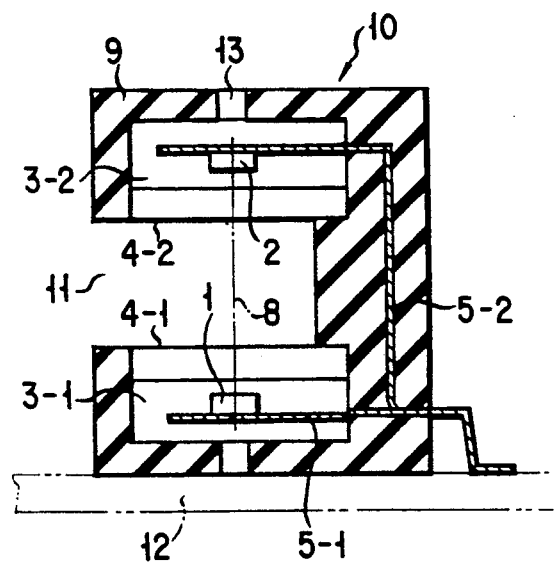
FIG. 1B is a cross-sectional view of the first embodiment, taken along line A—A in FIG. 1.
Figure 1C:
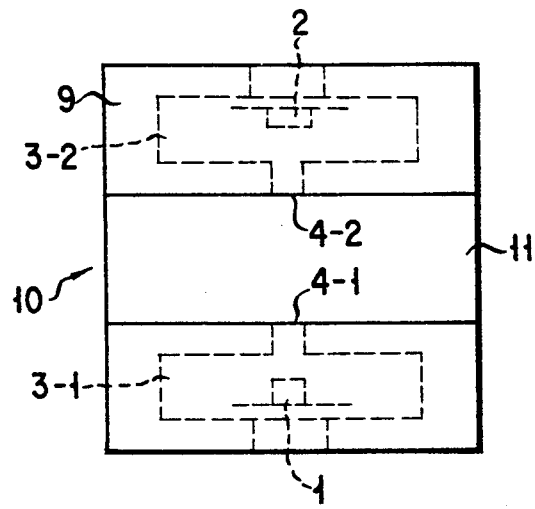
FIG. 1C is a front view of the first embodiment.

FIGS. 1A, 1B and 1C are a perspective view, a cross-sectional view, and a front view, all showing semiconductor photoelectric detector according to a first embodiment of the invention.

As is shown in FIGS. 1A to 1C and FIGS. 2A and 2B, the semiconductor photoelectric detector comprises a detector unit 10 and a base 12 supporting the unit 10.

The detector unit 10 has a light-emitting element 1, a light-receiving element 2, four leads 5-1 to 5-4, an opaque resin molding 9, and a base 12. The elements 1 and 2 are mounted on the tips of the leads 5-1 and 5- respectively. These leads 5-1 and 5-2 are positioned such that the optical axes of the elements 1 and 2 are aligned with each other. The leads 5 1 and 5-2 are connected at the proximal end to the elements 1 and 2, respectively, by means of wire bonding. (The leads 5-1 to 5-4 are prepared as parts of a lead frame, i.e., a one-piece component widely used in manufacturing IC chips.)

Figure 2A:
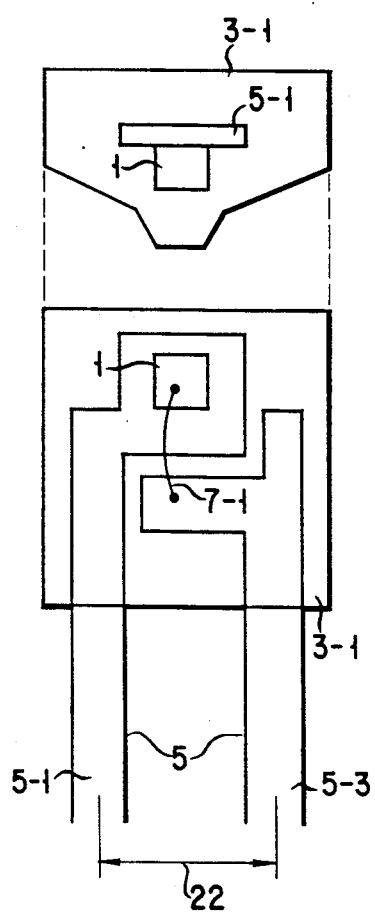
FIGS. 2A and 2B are, respectively, a top view and a plan view of the light-receiving device and the light-emitting device incorporated in the first embodiment.
Figure 2B:
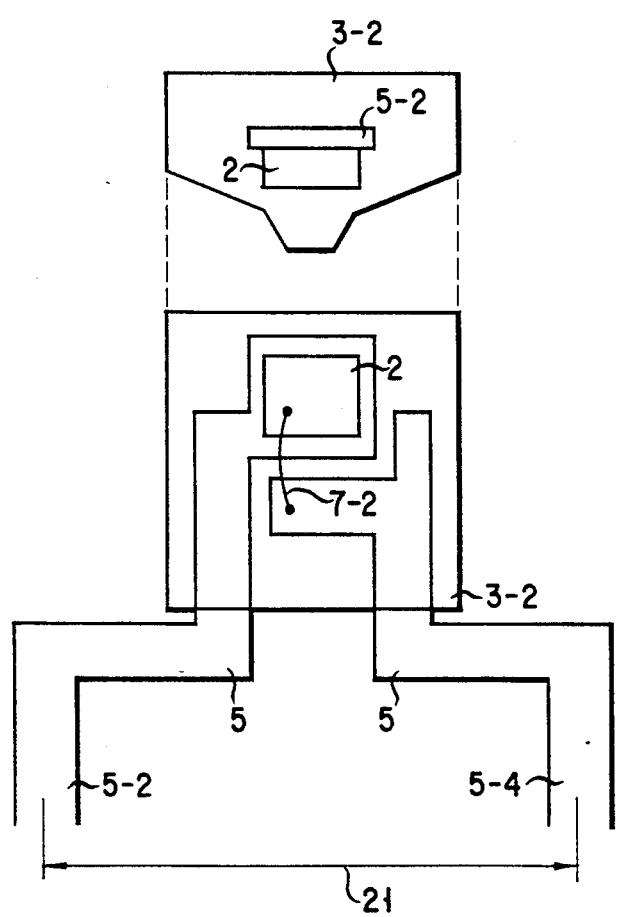

As is shown in FIG. 2A, the proximal ends of the leads 5-1 and 5-3 are spaced apart by a distance 22 of, for example, 1.27 mm. As is shown in FIG. 2B, the proximal ends of the leads 5-2 and 5-4 are spaced apart by a distance 21 of, for example, 3.81 mm, which is longer than the distance 22. As is best shown in FIG. 1B, the opaque resin molding 9 is mounted on the base 12, and the middle portions of the leads 5-2 and 5-4 are embedded within the molding 9 and extend vertically. The distal end portions of the leads 5-2 and 5-4 extend horizontally along the surface of the base 12. So do the leads 5-1 and 5-5, except for their distal ends. As is shown in FIG. 1B, the distal ends of the leads 5-1 to 5-4 are connected to the base 12.

FIGS. 3A and 3B show a semiconductor photoelectric detector according to a second embodiment of the invention. The second embodiment is characterized in that the distal end portions of the leads 5-1 and 5-3 protrude from one of the two opposing sides of the opaque resin molding 9, while those of the leads 5-2 and 5-4 protrude from the other of the opposing sides. The distal ends of the leads 5-2 and 5-4 can be spaced apart by a distance equal to, or different from, the gap between the distal ends of the leads 5-1 and 5-3. The distal end portions of the leads 5-1 to 5-4 are formed and connected to the base 12, exactly in the same way as in the first embodiment.

Figure 4A:
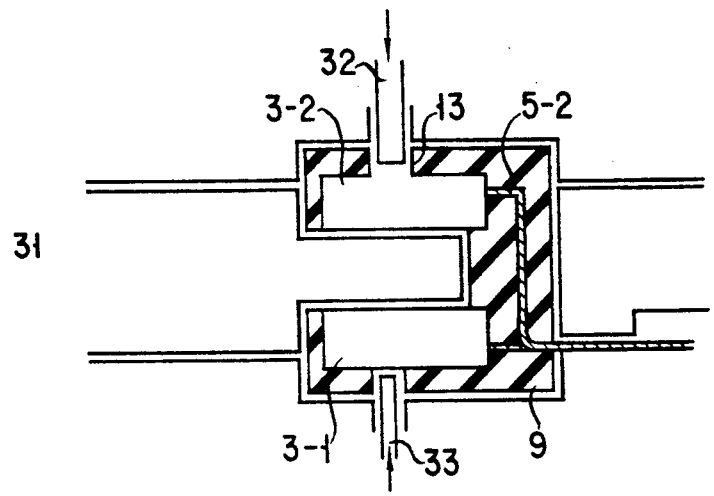
FIG. 4A is a diagram explaining how to manufacture the first embodiment.
Figure 4B:
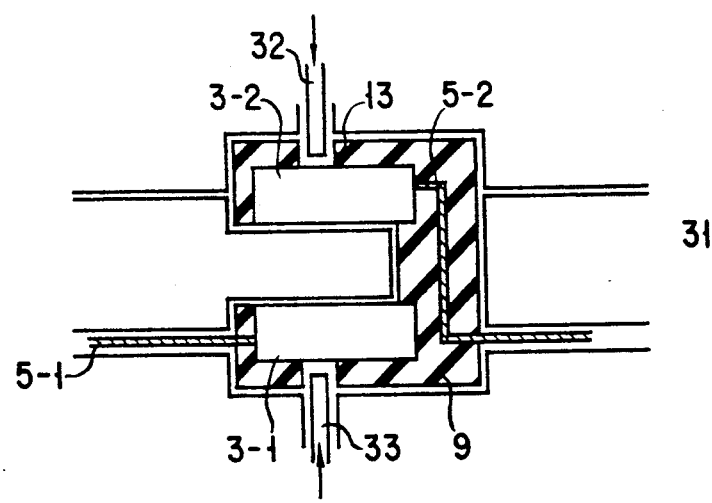
FIG. 4B is a diagram explaining how to manufacture the second embodiment.

With reference to FIG. 4A, it will be explained how the first embodiment is manufactured. First, the light-receiving element 2 is dye-bonded to the proximal end of the lead 5-2, and wire-bonded to the proximal end of the lead 5-4. The element 2 and the proximal end portions of the leads 5-1 and 5-3 are sealed within a molding 3-1 made of resin which is transparent to infrared rays. Next, both moldings 3 1 and 3-2 are placed in a metal mold 31. As can be understood from FIG. 4A, the mold 31 has a cavity for defining a rectangular block having a channel in one side, through which an object is passed to be detected. Then, pins 32 and 33 are moved, pushing the moldings 3-2 and 3-1 toward each other, until the moldings 3-1 and 3-2 come to desired positions. Molten opaque resin 9 is poured into the metal mold 31, while the pins 32 and 33 are holding the moldings 3-2 and 3-1 at the desired positions. During this molding, the distal end portions of the leads 5-1 to 5-4 are held, so that they protrude from the same side of the mold cavity and are juxtaposed at regular intervals. Thus, the distal ends of the leads 5-1 to 5-4 can easily be connected to the base 12.

FIG. 4A is a cross-sectional view of a metal mold 31 for molding the semiconductor photoelectric detector shown in FIGS. 3A and 3B, i.e., the second embodiment of the invention. The figure also explains how the second embodiment is manufactured. The method of manufacturing the second embodiment differs from the that of manufacturing the first embodiment (FIGS. 1A and 1B), only in one respect. That is, while the molten opaque resin 9 is poured into the metal mold 31, the distal end portions of the leads 5-1 and 5-3 are held, protruding from one side of the mold cavity, and the distal end portions of the leads 5-2 and 5-4 are held, protruding from the opposing side of the cavity.

Figure 5:
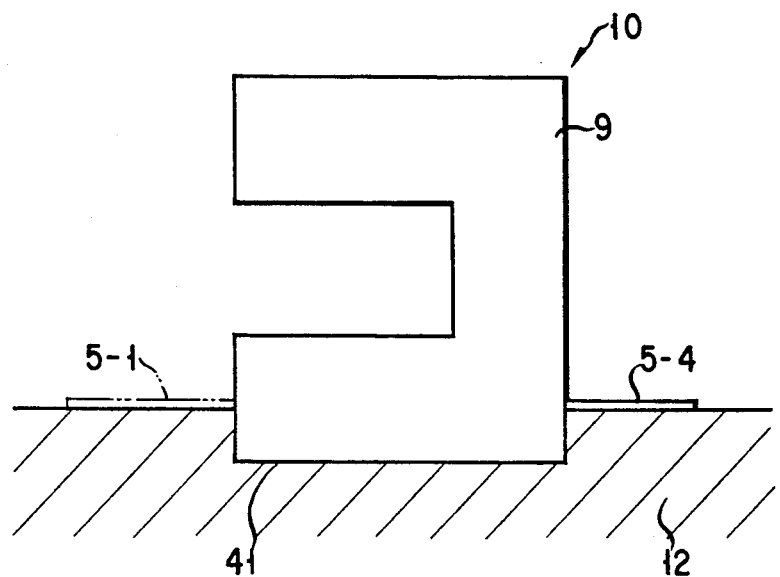
FIG. 5 is a cross-sectional view showing a third embodiment of this invention.

FIG. 5 shows a semiconductor photoelectric detector according to a third embodiment of this invention. This detector is characterized in two respects. First, the that the detector unit 10 has its lower portion embedded in the base 12. Second, the distal end portions of the leads 5-1 to 5-4, which protrude from the resin molding 9 are laid on the upper surface of the base 12 and extend horizontally, not bent at all. In this embodiment, the distal end portions of all leads 5-1 to 5-4 can protrude from one side of the resin molding 9. Alternatively, the distal end portions of the leads 5-1 and 5-3 can protrude from one side of the molding 9, whereas the remaining leads 5-2 and 5-4 protrude from the opposing side of the molding 9.

Figure 6:
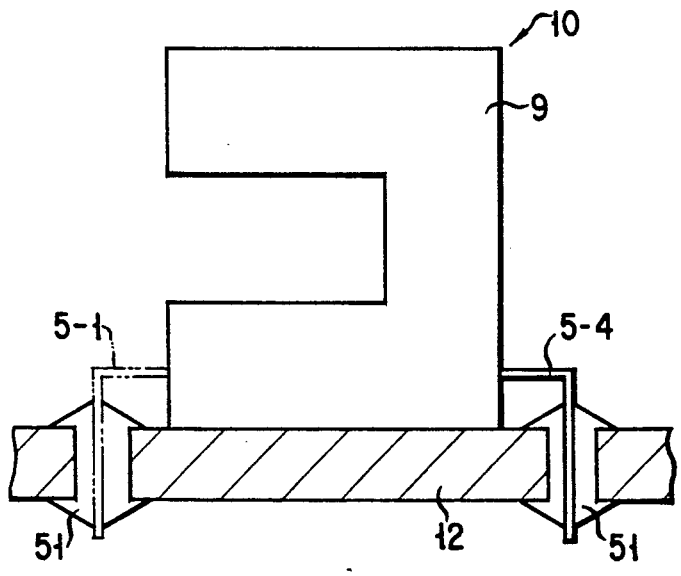
FIG. 6 is a cross-sectional view showing a fourth embodiment of the present invention.

FIG. 6 shows a semiconductor photoelectric detector according to a fourth embodiment of the present invention. This detector is characterized in that four through holes are made in the base 12, and the distal end portions of the leads 5-1 to 5-4 are held in these holes by masses 51 of solder. Also in this embodiment, the distal end portions of all leads 5-1 to 5-4 can protrude from one side of the resin molding 9. Alternatively, the distal end portions of the leads 5-1 and 5-3 can protrude from one side of the molding 9, whereas the remaining leads 5-2 and 5-4 protrude from the opposing side of the molding 9.

Figure 7:
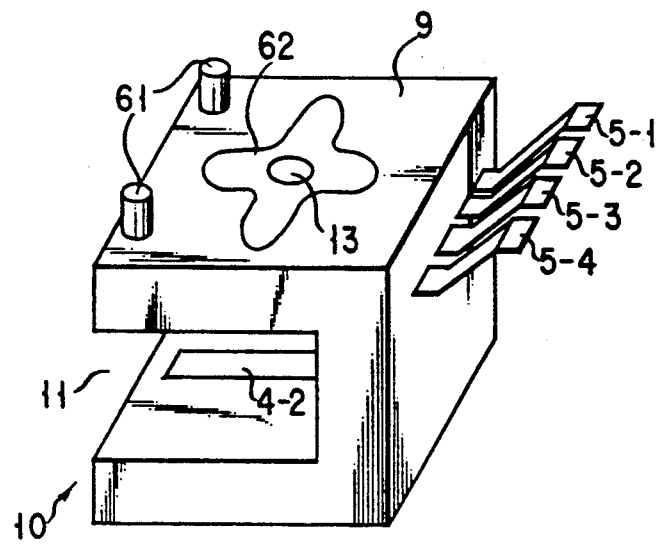
FIG. 7 is a perspective view showing a fifth embodiment of the invention.

FIG. 7 shows a semiconductor photoelectric detector according to a fifth embodiment of the invention. This detector is designed such that it can be attached to a base (not shown). It comprises an opaque resin molding 9, a light-emitting element (not shown) sealed within the molding 9, and a light-receiving element (not shown) sealed within the molding 9, too. The light-emitting and -receiving elements are positioned such that their optical axes are aligned. The molding 9 has a channel 11 which is located such that the common axis of the elements extends vertically. Two projections 61 protrude from the top of the opaque resin molding 9. They are to be fitted into two holes made in the surface of the base and secured therein with adhesive. Once the projections 61 are fitted in the holes and secured therein with the adhesive, the detector unit 10 is attached to the base, set in a predetermined position with respect to the base. A cross-shaped, shallow recess 62 is formed in the top surface of the molding 9. Into this recess 62, will an excessive part of the adhesive applied on the projections 61 and in the holes flow and not flow out through the gap between the unit 10 and the base when the projections 61 are fitted into the holes, thereby to fasten the detector unit 10 to the base. Further, no members are required to fasten the detector unit 10 to the base.

Figure 8A:
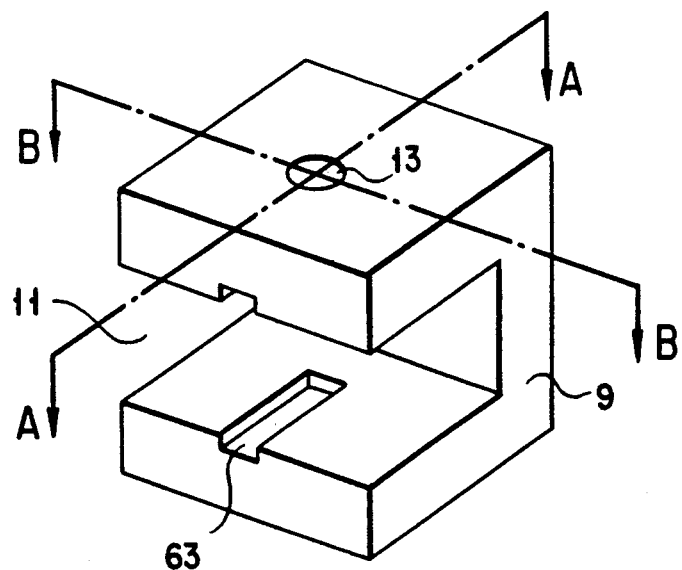
FIGS. 8A, 8B, and 8C are cross-sectional views showing a sixth embodiment of this invention.
Figure 8B:
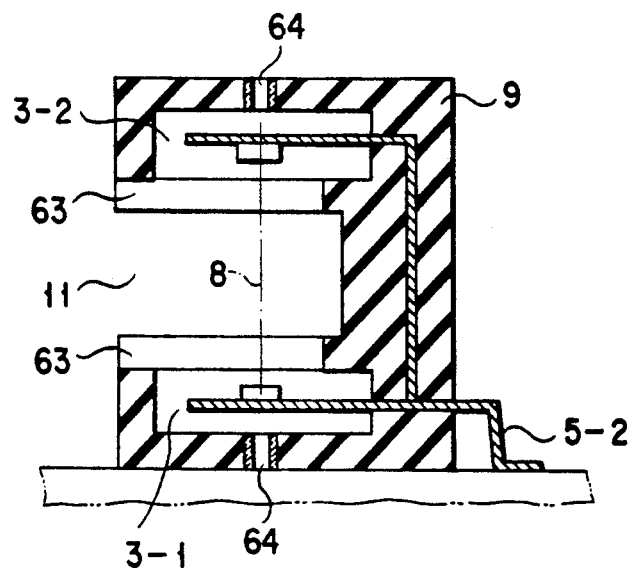
Figure 8C:
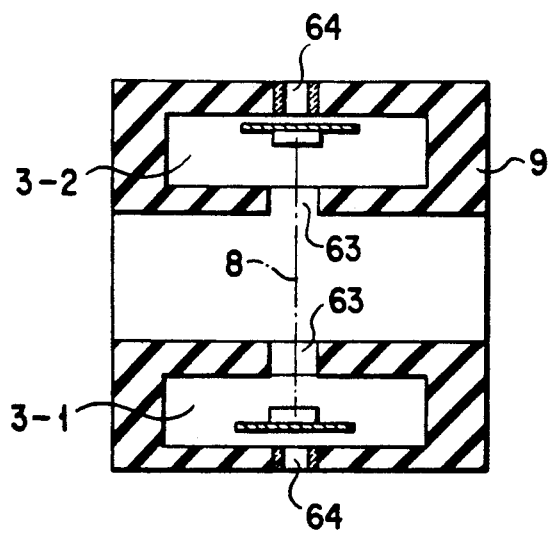

FIG. 8 shows a semiconductor photoelectric detector according to a sixth embodiment of this invention. The sixth embodiment is characterized in that the molding 3-1 containing a light-emitting element 1 has a hollow projection 64 on its lower surface, and the molding 3-2 containing a light-receiving element 2 has a hollow projection 64 on its upper surface. Either hollow projection 64 opens at its free end. The projections 64 serve to position the moldings 3-1 and 3-2 correctly during the manufacture of the detector unit 10, as will be explained below.

To manufacture the unit 10, two pins of a machine (not shown) for manufacturing the unit 10 are inserted into the projections 64. As a result, both moldings 3-1 and 3-2 are positioned in a mold, such that the optical axes of the elements 1 and 2 are aligned with each other. Then, with the moldings 3-1 and 3-2 so positioned in the mold, molten opaque resin is poured into the mold, thereby forming an opaque resin molding 9. During the molding process, the moldings 3-1 and 3-2, held by the pins, do not move at all despite the flow of the molten resin.

The sixth embodiment is also characterized in that the upper surface of the molding 3-1 is covered with a transparent layer 4-1, and the lower surface of the molding 3-2 is covered with a transparent layer 4-2. The transparent layers 4-1 and 4-2 have an opening 63 each. The openings 63 are aligned with the common optical axis 8 of the light-emitting and -receiving elements 1 and 2. Since the transparent layers 4-1 and 4-2 have openings 63, the light beam emitted from the element 1 is applied to the element 2, with an energy loss less than otherwise. This helps to reduce the possibility of the unit 10 making errors.

Figure 9:
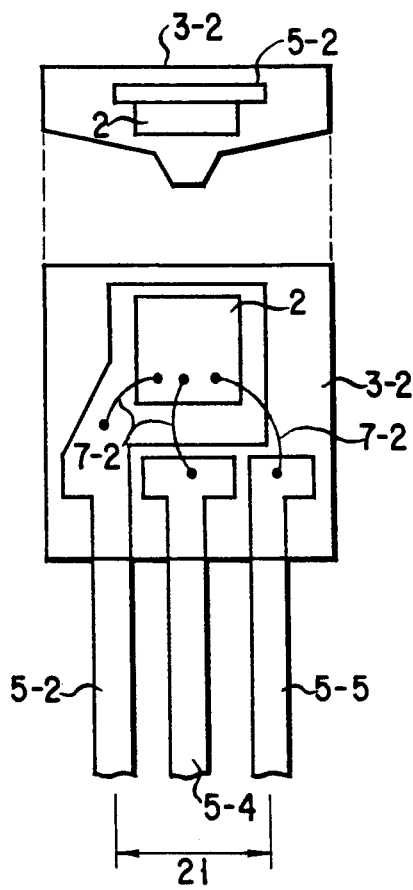
FIG. 9 consists of a side view and a plan view of the light-receiving device used in a seventh embodiment of the invention.
Figure 10:
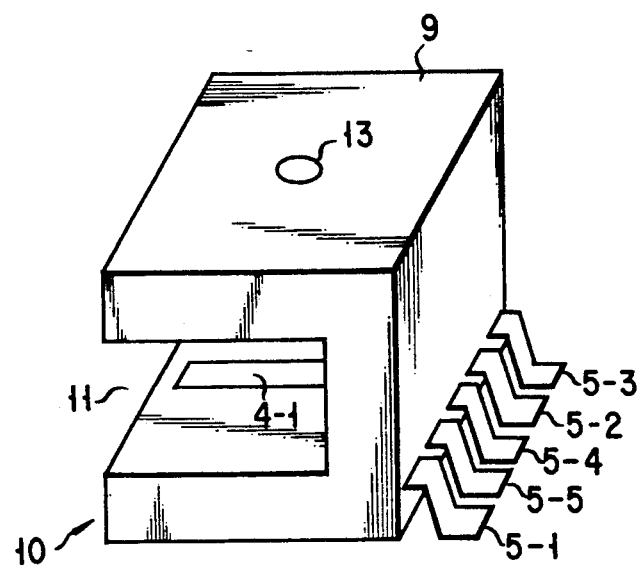
FIG. 10 is a perspective view of the seventh embodiment of the present invention.

FIG. 9 shows the light-receiving device used in a seventh embodiment of the invention. As is evident from FIG. 9, the light-receiving device has a light-receiving element 2 and three leads 5-2, 5-4 and 5-5. The leads 5-2, 5-4 and 5-5 are connected to the element 2 by three wires 7-2, respectively. FIG. 10 is a perspective view of the seventh embodiment of the present invention. As is shown in FIG. 10, five leads including the leads 5-2, 5-4 and 5-5 protrude from one side of an opaque resin molding 9. Of these leads, the leads 5-1 and 5-3 are electrically connected to the light-emitting element (not shown) whose optical axis is aligned with that of the light-receiving element 1. Since the light-receiving device has three leads, its output signal is more reliable than in the case where the device has only two leads.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A semiconductor photoelectric detector comprising:
   a detector unit which comprises:
   means for emitting light;
   means for receiving the light emitted by said light-emitting means;
   first and second wiring means for electrically wiring to said light-emitting means;
   third and fourth wiring means for electrically wiring to said light-receiving means; and
   means for holding said light-emitting and light-receiving means such that the optical axes of said light-emitting and -receiving means are aligned, and electrically insulating the first, second, third and fourth wiring means; and
   means for supporting said detector unit such that the common optical axis of said light-emitting and -receiving means extends at right angle to that side of said support means on which said detector unit is mounted, and having an electric circuit electrically connected to said first, second, third and fourth wiring means,
   wherein said first and second wiring means or said third and fourth wiring means, or all wiring means are located, partly within said holder means, extend parallel along one surface of said holder means and have distal end portions protruding from the same side of said holder means.

2. A detector according to claim 1, wherein said light-emitting means and said light-receiving means are sealed within two moldings, respectively, which are made of resin transparent to the light emitted from said light-emitting means.

3. A detector according to claim 1, wherein said first and second wiring means are spaced apart by a distance longer than a distance by which said third and fourth wiring means are spaced apart.

4. An apparatus according to claim 1, wherein the distal end portions of said first, second, third and fourth wiring means are bent and extend parallel to said support means.

5. An apparatus according to claim 1, wherein said first, second, third and fourth wiring means have each a metal pin at the distal end, which is inserted in said support means.

6. An apparatus according to claim 1, wherein said support means has holes for holding said first, second, third and fourth wiring means.

7. A detector according to claim 2, wherein said moldings are made of resin which is transparent to at least infrared rays.

8. A detector according to claim 1, wherein said support means has holes, and said holder means has projections which are to be fitted into the holes of said support means.

9. A detector according to claim 1, wherein a recess for accumulating adhesive is formed in that surface of said holder means which contacts said support means.

10. A detector according to claim 2, wherein said moldings have a light-emitting surface and a light-receiving surface, respectively, and at least one of said moldings has a hollow projection on a surface facing away from the light-emitting or receiving surface, said hollow projection having served to position said at least one of said moldings such that the optical axes of said light-emitting and -receiving elements are aligned with each other.

11. A detector according to claim 2, wherein said moldings have a slit each to the common optical axis.

12. A detector according to claim 1, wherein said detector unit further comprises a fifth wiring means.

13. A semiconductor photoelectric detector comprising:
   a detector unit which comprises:
   means for emitting light;
   means for receiving the light emitted by said light-emitting means,
   first and second wiring means for electrically wiring to said light-emitting means;
   third and fourth wiring means for electrically wiring to said light-receiving means;
   means for holding said light-emitting and light-receiving means such that the optical axes of said light-emitting and -receiving means are aligned, and electrically insulating said first, second, third and fourth wiring means; and
   means for supporting said detector unit such that the common optical axis of said light-emitting and -receiving means extends at right angle to that side of said support means on which said detector unit is mounted, and having an electric circuit electrically connected to said first, second, third and fourth wiring means,
wherein said first and second wiring means or said third and fourth wiring means, or all wiring means are located, partly within said holder means, and extend parallel along one surface of said holder means, two of said first to fourth wiring means have distal end portions protruding from a side of said holder means, and the other two of said first to fourth wiring means have distal end portions protruding rom that side of said holder means which opposes said one side thereof.

* * * * *